US006947946B2

(12) United States Patent
Nishikawa

(10) Patent No.: US 6,947,946 B2
(45) Date of Patent: Sep. 20, 2005

(54) DATABASE SYSTEM INCLUDING HIERARCHICAL LINK TABLE

(75) Inventor: Hidenori Nishikawa, Tokyo-to (JP)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 09/742,657

(22) Filed: Dec. 21, 2000

(65) Prior Publication Data

US 2001/0051946 A1 Dec. 13, 2001

(30) Foreign Application Priority Data

Dec. 28, 1999 (JP) .......................................... 11-375718

(51) Int. Cl.⁷ .............................................. G06F 17/30
(52) U.S. Cl. ........................ 707/102; 707/10; 707/101; 709/223
(58) Field of Search .......................... 707/2, 8, 10, 101, 707/102, 103 R, 203, 500.1; 709/223; 375/225; 705/400; 370/468, 412

(56) References Cited

U.S. PATENT DOCUMENTS

| | | | | |
|---|---|---|---|---|
| 5,666,554 A | * | 9/1997 | Tanaka | 707/500.1 |
| 5,701,457 A | * | 12/1997 | Fujiwara | 707/8 |
| 5,826,250 A | * | 10/1998 | Trefler | 707/2 |
| 5,828,842 A | * | 10/1998 | Sugauchi et al. | 709/223 |
| 5,835,757 A | * | 11/1998 | Oulid-Aissa et al. | 707/10 |
| 6,016,497 A | * | 1/2000 | Suver | 707/103 R |
| 6,112,024 A | * | 8/2000 | Almond et al. | 707/203 |
| 6,118,792 A | * | 9/2000 | Beshai | 370/468 |
| 6,189,012 B1 | * | 2/2001 | Mital et al. | 707/103 R |
| 6,240,402 B1 | * | 5/2001 | Lynch-Aird | 705/400 |
| 6,249,789 B1 | * | 6/2001 | Delia et al. | 707/102 |
| 6,272,495 B1 | * | 8/2001 | Hetherington | 707/101 |
| 6,292,801 B1 | * | 9/2001 | Campbell et al. | 707/10 |
| 6,351,487 B1 | * | 2/2002 | Lu et al. | 375/225 |
| 6,438,591 B1 | * | 8/2002 | Fehskens et al. | 709/223 |

FOREIGN PATENT DOCUMENTS

| | | |
|---|---|---|
| JP | 03-040043 | 2/1991 |
| JP | 07-152546 | 6/1995 |
| JP | 10-301824 A | 11/1996 |
| JP | 09-212515 | 8/1997 |
| JP | 10-301824 | 11/1998 |

OTHER PUBLICATIONS

Hiraoka Akio, "Extension and Application of the Link Facility in the Link Oriented DBMS G–Base," Mar. 11, 1991, pp. 1–10.
Kanemasa, Yasuhiko et al., "Storage Management of a XML Query Processing System xQues," Jul. 22, 1999, pp. 243–248.

* cited by examiner

*Primary Examiner*—Charles Rones
*Assistant Examiner*—Hassan Nahmoudi
(74) *Attorney, Agent, or Firm*—Norman L. Gundel; Hoffman, Warnick & D'Alessandro LLC

(57) ABSTRACT

The present invention provides a database system having a database in which data to be processed by an application program are stored (hierarchical node database). A table (hierarchical link table) in which mainly relationship data (e.g., a pointer) for the database are entered is prepared for a corresponding application program. The individual application programs can refer to the corresponding hierarchical link tables and can access desired hierarchical node databases. When the hierarchical data structure is to be changed, such as by the addition of an application due to a new request, a corresponding alteration need only be reflected in the hierarchical link table.

13 Claims, 15 Drawing Sheets

FIG. 4
Database relationship viewed from a specific application program
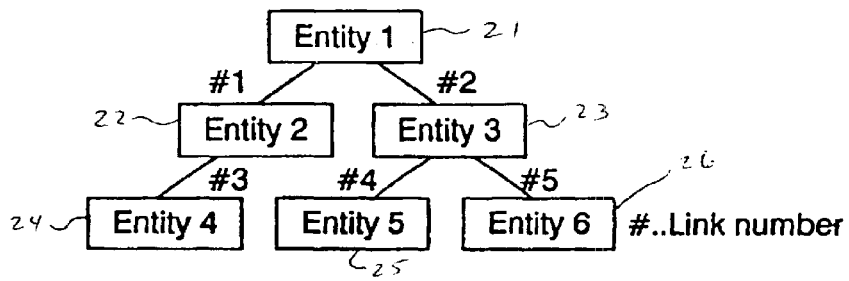
Conventional data storage method
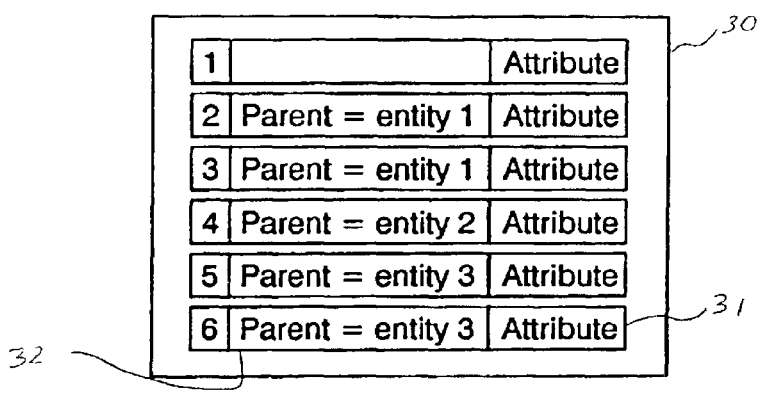
Data storage method using hierarchical link table
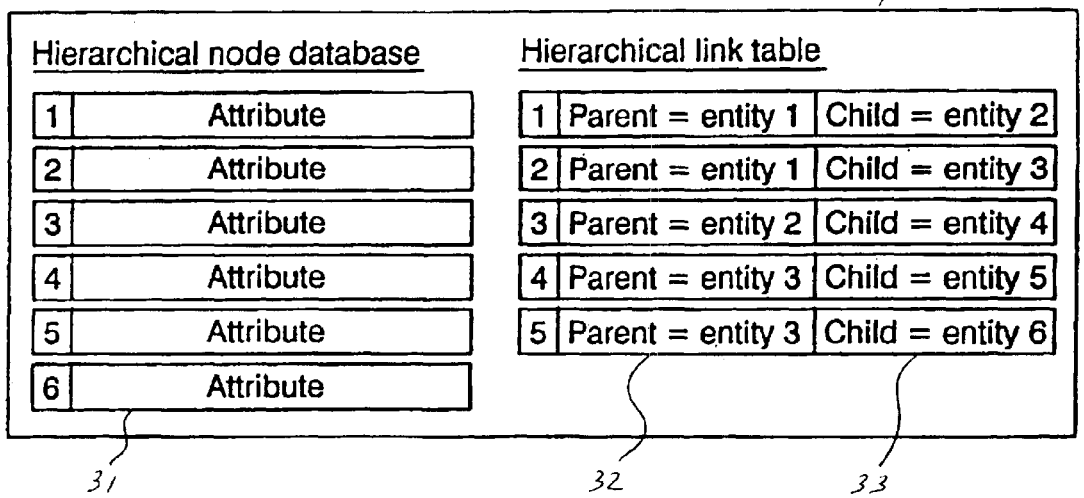

Entities required for application

Hierarchical node database

| Node ID | Node attribute |
|---|---|
| 100 | Entity ID = 1, Name = .... |
| 101 | Entity ID = 2, Name = .... |
| 102 | Entity ID = 3, Name = .... |
| 103 | Entity ID = 4, Name = .... |
| 104 | Entity ID = 5, Name = .... |
| 105 | Entity ID = 6, Name = .... |

Used in common by various applications

FIG. 9

Discount calculation structure for a specific client

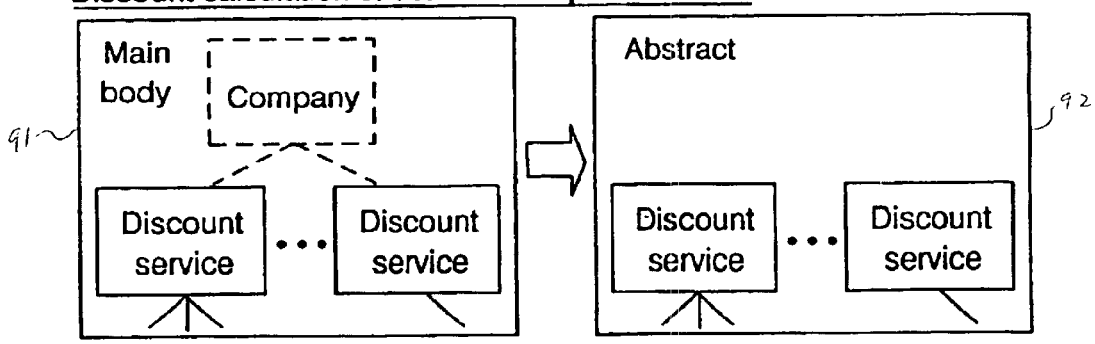

Hierarchical node database: Product catalog

| Product ID | Attribute |
|---|---|
| Product/service 1 | Attribute 1 |
| Product/service 2 | Attribute 2 |
| Product/service 3 | Attribute 3 |
| Product/service 4 | Attribute 4 |
| Charge calculation 4 | Attribute 4 |
| Discount 5 | Attribute 5 |
| Discount 6 | Attribute 6 |

Hierarchical link table: Discount structure 1

| Link ID | Owner | Parent node | Child node |
|---|---|---|---|
| Link 1 | Discount structure 1 | Charge calculation 4 | Product/service 1 |
| Link 2 | Discount structure 1 | Charge calculation 4 | Product/service 2 |
| Link 3 | Discount structure 1 | Charge calculation 4 | Product/service 4 |
| Link 4 | Discount structure 1 | Charge calculation 4 | Product/service 3 |
| Link 6 | Discount structure 1 | Discount 5 | Product/service 1 |
| Link 7 | Discount structure 1 | Discount 5 | Product/service 2 |
| Link 8 | Discount structure 1 | Discount 6 | Product/service 1 |
| Link 9 | Discount structure 1 | Discount 6 | Product/service 3 |
| Link 10 | Discount structure 1 | Discount 6 | Product/service 4 |

FIG. 10

Aggregate charge structure for a specific client

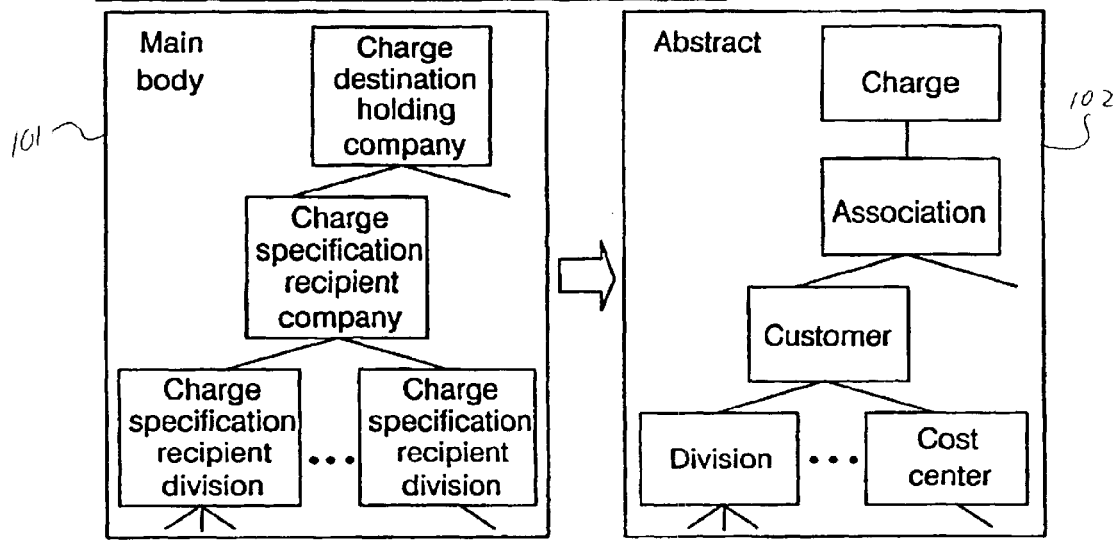

Hierarchical node database: Organization DB

| Organization ID | Attribute |
|---|---|
| Association 1 | Attribute 1 |
| Customer 1 | Attribute 1 |
| Division 1 | Attribute 1 |
| Division 2 | Attribute 2 |

Hierarchical node database: Product catalog

| Product ID | Attribute |
|---|---|
| Charge 1 | Attribute 1 |
| Product/service 1 | Attribute 1 |
| Product/service 2 | Attribute 2 |
| Product/service 3 | Attribute 3 |
| Product/service 4 | Attribute 4 |

Hierarchical link table: Charge structure 1

| Link ID | Owner | Parent node | Child node |
|---|---|---|---|
| Link 1 | Discount structure 1 | Charge 1 | Association 1 |
| Link 2 | Discount structure 1 | Association 1 | Customer 1 |
| Link 3 | Discount structure 1 | Customer 1 | Cost center 1 |
| Link 4 | Discount structure 1 | Customer 1 | Cost center 2 |
| Link 5 | Discount structure 1 | Association 1 | Customer 2 |

FIG. 11

Example used for hierarchical link table: (111)

| Link ID | Effective start date | Effective end date | Structure name/ Owner ID | Parent node | Child node |
|---|---|---|---|---|---|
| 28 | 1999.1.10 | | Application AP1 | 100 | 101 |
| 29 | 1999.1.10 | | Application AP1 | 100 | 104 |
| 30 | 1999.1.10 | 1999.3.31 | Application AP1 | 101 | 103 |
| 31 | 1999.4.1 | | Application AP1 | 101 | 102 |

| Link ID | Effective start date | Effective end date | Structure name/ Owner ID | Parent node | Child node |
|---|---|---|---|---|---|
| 32 | 1999.1.10 | | Application AP2 | 105 | 101 |
| 33 | 1999.1.10 | 1999.3.31 | Application AP2 | 101 | 103 |
| 34 | 1999.1.10 | | Application AP2 | 105 | 100 |

Example used for hierarchical node database: (112)

| Node ID | Effective start date | Effective end date | Node attribute |
|---|---|---|---|
| 100 | 1999.1.1 | | Entity ID = 1, Name = .... |
| 101 | 1999.1.1 | | Entity ID = 2, Name = .... |
| 102 | 1999.4.1 | | Entity ID = 3, Name = .... |
| 103 | 1999.1.1 | 1999.3.31 | Entity ID = 4, Name = .... |
| 104 | 1999.1.1 | | Entity ID = 5, Name = .... |
| 105 | 1999.1.1 | | Entity ID = 6, Name = .... |

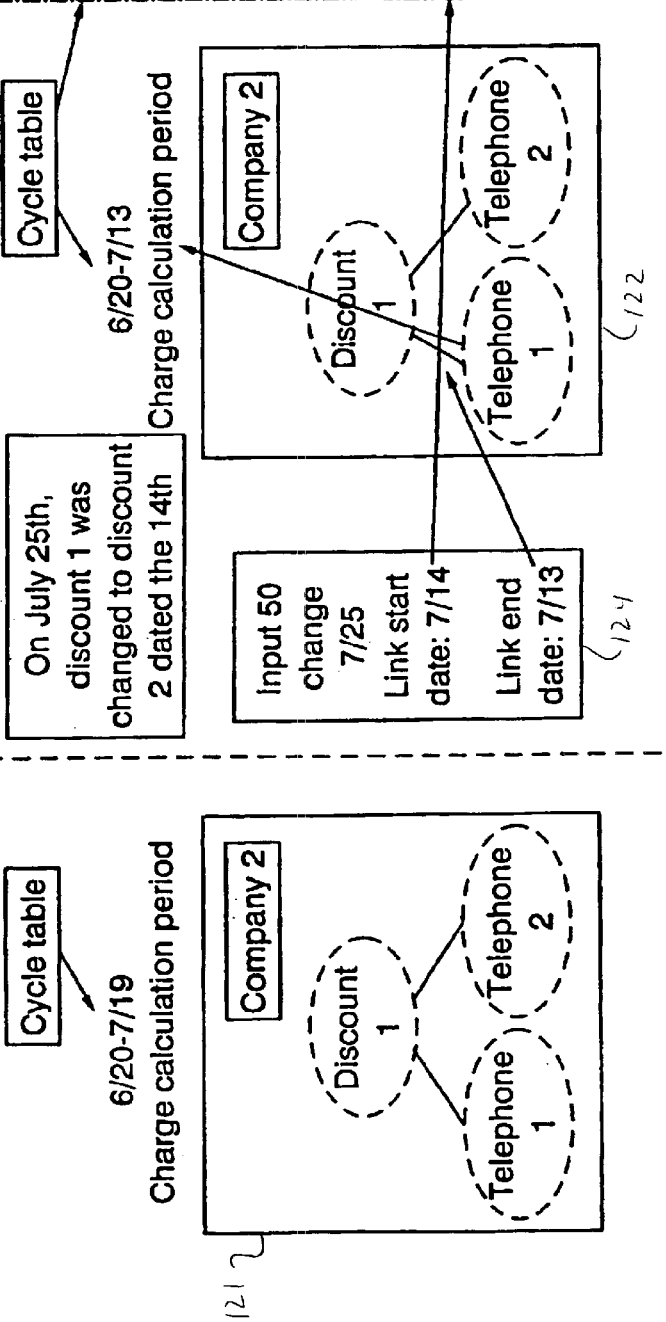

| Node ID | Effective start date | Effective end date | Node attribute |
|---|---|---|---|
| | 1999.1.1 | 1999.3.31 | Type = nearest address, Telephone address ID = ... |
| | 1999.4.1 | | Type = nearest address, Telephone address ID = ... |
| | 1999.1.1 | 1999.3.31 | Type = cable, Cable ID =, Cable name = ... |
| | 1999.4.1 | | Type = cable, Cable ID =, Cable name = ... |
| | 1999.1.1 | | Type = HH, HH - ID =, HH name = ... |
| | 1999.1.1 | | Type = optical center line, Optical center line No =, Status = vacant |
| | 1999.8.1 | | Type = ONU. ONU type =. ONU - ID = ... |
| | 1999.8.1 | | Type = ONU - LC, C slot No = ... |
| | 1999.1.1 | | Type = N - SLT, SLT - ID = ... |
| | 1999.1.1 | | Type = OSU, OSU position = ... |
| | 1999.1.1 | | Type = VCN, VCN position = ... |
| | 1999.1.1 | | Type = connection terminal, Connection terminal No = ... |
| | 1999.1.1 | | Type = metal center line, Center line No = ... |
| | 1999.1.1 | | Type = LXM position, LXM position No = ... |
| | 1999.1.1 | | Type = DSU, DSU - ID = ... |
| | 1999.1.1 | | Type = connection terminal, Connection terminal No = ... |
| | | | |

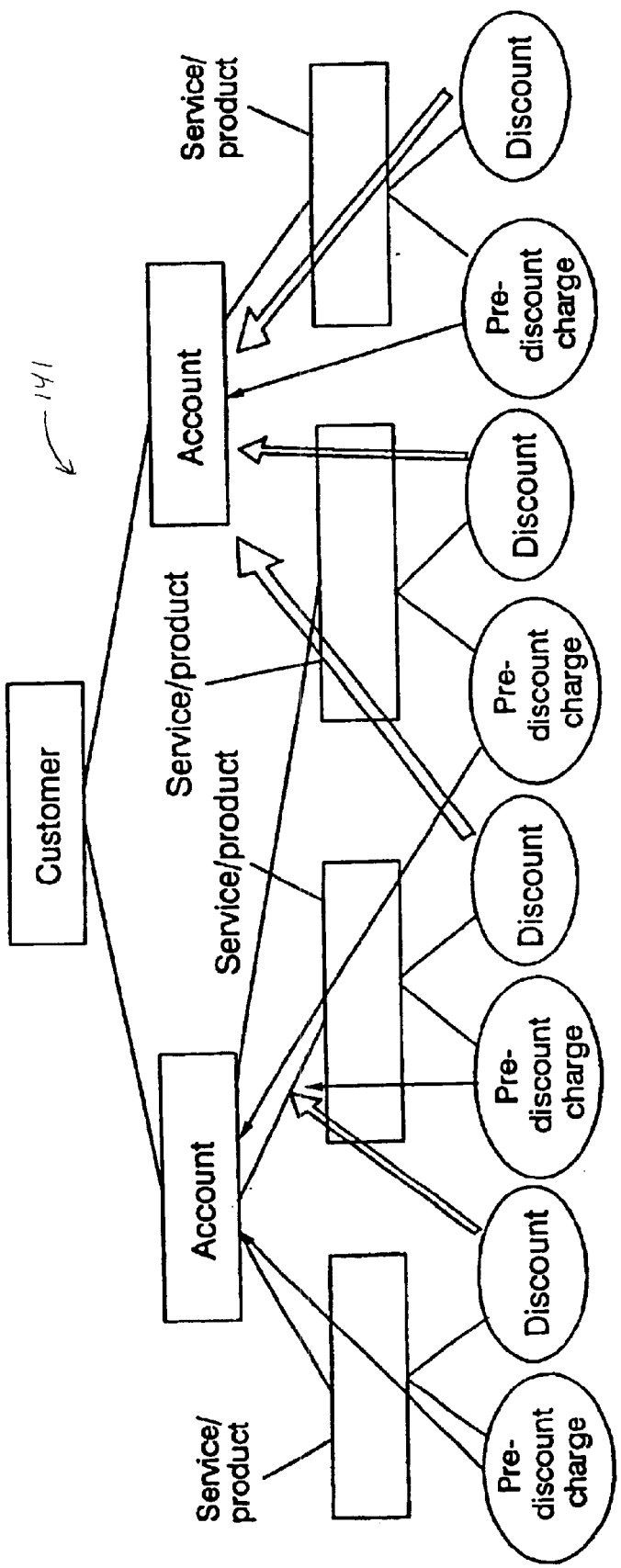

DATABASE SYSTEM INCLUDING HIERARCHICAL LINK TABLE

BACKGROUND OF THE INVENTION

1. Field of the Invention

The present invention relates to a database system that is accessed by an application program that executes a specific operation, and relates in particular to a database system that can flexibly cope with an addition to or a change in the application contents or in relationships among data.

2. Description of the Related Art

Since an application program that executes a specific operation handles a large amount of data, normally, such data are stored and managed by a database system. This database system is generally constructed as follows. First, databases (also called entities) required for all the application programs, and data entries for the pertinent databases (also called attributes of the individual entities) are obtained. Then, the relationship between the databases (the hierarchical structure, such as a parent-child relationship) and the relationship between the data entries for each database are defined or determined, so that processing can be efficiently performed by all possible application programs. These relationships that are determined can be represented as an ER diagram (Entity Relationship diagram). An ER diagram is defined as an actual database for which the function of a database management system (DBMS) is used. For example, a relational database is defined using a language such as SQL. As a result, in each database, relationship data (e.g., a pointer) pointing to a record identifier for a related database is generated in a record (a key area or a column) in which the actual values and the contents (instances) of individual data are stored. Actually, the relationship data (e.g., pointers) tend to be generated by an application program as a part of a normal application.

When the contents of an application are changed or a new application is added, or when a database is added or changed, the relationship/hierarchical structure of the databases is modified accordingly (for example, the parent-child relationship is canceled/added/reversed). In this case, an alteration operation must be performed by which the databases are again related with each other in the above described manner, and the obtained hierarchical structure is stored in a database using the function for the database management system (DBMS). Further, relationship data, such as pointers, that are present in a record (column) in each conventional database must be changed. Specifically, a program for changing the database is prepared, and is then used to alter the database.

When such a change is made, all the application programs that employ the modified database (which read and process data entries, or which write and update data) must be examined to confirm that the contents have been changed in accordance with the hierarchical structure of the database, and that the modification has had no adverse affect. As a part of a normal application, a process could be performed by which, while there is no change in the relationship of the databases, i.e., in the database hierarchical structure, the relationship of a record in a database to a record in another related database would be changed (e.g., a parent-child relationship or a positional relationship is modified at a so-called instance level, such as a case wherein a client A gives a specific telephone number to another person). An application program will handle this change process.

For a specific application program, the relationship and the hierarchical structure required for the processing are present in a group of databases that are employed by the program. Since this relationship/hierarchical structure constitutes a part (a subset) of the relationship existing among all the databases, a different relationship/hierarchical structure for the pertinent application program need not be prepared. That is, by navigating through those relationship data, such as pointers, that represent the relationship among all the databases, a required database can be reached. However, while taking working efficiency into account, the relationship/hierarchical structure of a pertinent application program is normally prepared using a function of the database management system (DBMS) called the view function. Using this function, an application program can access a pertinent database group by referring to the view.

When an operational database used for applications is viewed in another way, generally, the actual value/contents (instances) of the latest data are stored in individual records in each database, and only the latest data can be employed. The "latest" here is a value (results of a nighttime batch process) obtained when a nighttime process was completed for the preceding day, or the latest state (results of a real time process) obtained by adding/updating data each time a transaction occurs. When an application program performs a process for each specific period, for example, when an application program totals at the end of a month the records stored during that month, the pertinent application program accesses the database at the end of the pertinent month and performs a predetermined process based on all the latest data records that are stored in the database. However, a case exists wherein the relationship among databases or data records is changed at a specific time in the middle of a month (e.g., a case wherein the parent-child relationship (or belonging relationship) is changed at a so-called instance level, such as when client A gives (actually, sells) a specific telephone number to another person). In this case, data representing the period during which the pertinent relationship was effective are not included in conventional relationship data (e.g., a pointer). As a result, when the change of the relationship occurs, the pertinent application program must be temporarily initiated based on the latest recorded data and the relationship data, and at the end of the month in which the relationship was changed, that application program must again be executed based on the latest recorded data, i.e., the changed data and the relationship data.

Problems to be Solved by the Invention

However, for the above database construction method, it is extremely difficult and takes a very long time for the relationships among all the databases that all the assumed application programs require to be searched for in advance, and to be defined and determined. Actually, therefore, the relationships are defined or determined while being compromised, to a degree. Thus, later, the relationships among the databases must be changed frequently, and accordingly, for the application programs, many changes and many tests must be performed and the expenditure of an enormous amount of time and effort is required. The hierarchical structure that is prepared by the view function of the database management system (DBMS) is nothing more than a subset of the overall hierarchical structure, and does not constitute the main body of the database. Therefore, the view-based hierarchical structure can not be independently changed, and the same problem as described above will arise.

This means that a database system can not be provided that can flexibly and quickly cope with the addition of a new application or a change in the contents of a conventional application. That is, even when a new application status develops that has a new database relationship/hierarchical structure (for example, when, to win out over competition, a new product or service is provided that has a database parent-child/grouping relationship that differs from a conventional one), a database system can not be quickly updated. Further, when a database parent-child relationship that is required for a specific application program is the reverse of a database parent-child relationship that is required for another application program, or when a database parent-child relationship is to be reversed because the status of an application has changed, occasionally the hierarchical structure of the database can not be defined, and such an application status can not be implemented. Or consider a situation wherein although an application program was specifically designed to process a certain reference database (parent entity) and a group of databases (child entities) that depend from it, another entity is added at an upper level (a grand-parent level), higher than that of the original reference database (parent entity), and following this, the processing of the databases have to be based on the new grand-parent entity (e.g., a case wherein when a "company" is acquired by a "holding company," an application program that was designed to perform charge or discount processing while using as a reference unit an upper entity comprising the "company," thereafter is required to perform the same processing while using as a reference unit an upper entity comprising the "holding company"). For this, all the databases and the relationship data, and the associated application program would have to be drastically changed, and actually, in many cases such a change is not even attempted. Further, the same problem occurs when, in the above example, the data records (instances) of the two reference databases (entities) must be combined to form a single database (e.g., two companies are merged into a single company).

In other circumstances, another, different problem has arisen. In an application program for performing a process at intervals corresponding to a specific time period, when the data records in the databases, or the relationships of the databases, must be changed during the course of such a time period, the above described complicated process for executing the program is required. Generally, merely the data contents that correspond to a specific time, the latest, whereat the database was used by the application are maintained. Therefore, the program execution process is required because a retroactive process can not be performed, even though the database has been accessed. In this case, the program must be executed each time a database change is required, or when a stored file that contains historical data (e.g., a log file) must be read and a special process performed. Thus, since a function for such a special process must be prepared for the application program, this results in an increase in the complexity and size of the program and in a deterioration in its quality, and in an increase in the program development and maintenance costs.

Since, as is described above, the hierarchical structure that is constructed by using the database management system (DBMS) function, called the view, is not the main body of the database, the effective time data required by the application can not be arbitrarily established, and the above problems can not therefore be resolved.

SUMMARY OF THE INVENTION

It is one object of the present invention to resolve the above described problem, i.e., a problem that prevents a conventional database system from flexibly and quickly cope with a change in the contents of an application, or a change in the contents or the relationships of databases. Therefore, the present invention provides a database management system whereby the relationships of databases (entities) can be flexibly established or changed without a great work load being imposed on the development/maintenance of the databases or an application program, and a database management system that can independently handle a period for processing databases by using an application program and a period for adding or changing the relationships of the databases or for adding or changing data records (instances), while obtaining flexibility along the same time axis (the elapse of time) by improving mutual dependency. Therefore, a database system that can be altered flexibly can be provided.

Specifically, according to the present invention, data (pointers, etc.) for the relationship of databases, called "hierarchical node databases," are in principle not included in the individual databases (and their data records) that are to be processed. Tables (a type of database), called "hierarchical link tables," in which relationship data for the database (entities) are mainly entered, are prepared that correspond to the individual application programs, which can refer to the corresponding hierarchical link tables to access desired hierarchical node databases.

One part of the relationship data may be included in the hierarchical node databases for the reason that a hierarchical link table that is destroyed for a specific cause can thus be recovered via another route.

According to the database management system of this invention, databases that are required by all the assumed application programs need neither be searched for in advance nor be defined or determined. Instead, only the databases that currently seem to be necessary need be listed in the hierarchical link table to satisfy requests made for application programs. When an application program is added in accordance with a new request, a corresponding alteration must be reflected in the hierarchical link table. Further, when the parent-child relationship of the databases that is required by a specific application program is the reverse of the parent-child relationship that is required for another application program, or when the parent-child relationship is to be reversed because a new application request has been added, the hierarchical node databases in which data are stored need not be changed, and only the parent-child relationship or the hierarchical structure must be defined that is required for the hierarchical link tables that correspond to the application programs. The same process can be performed in a case wherein a specific reference database (entity) must be added or modified (see the above "holding company" example), or a case wherein the data records (instances) of two reference databases (entities) are combined (see the above merging of companies example).

The individual data records in each hierarchical link table are comparatively short, and only the relationship data (a pointer, etc.) and, as needed, effective period data that will be described later are stored therein. Thus, the hierarchical link table can be easily changed within a short period of time, even when data have been backed up to prepare for the occurrence of a malfunction. Further, since only one, or an extremely small number, of the corresponding application programs are adversely affected by such a change, a comparatively small amount of labor is required to perform a confirmation test after the change.

Furthermore, according to the present invention, a period can be established during which a parent-child relationship or a hierarchical node database (data record) hierarchical structure, which is stored as pointer data in a data record, is effective for a corresponding application program, i.e., an effective date (effective start date) and an ineffective date (effective end date) can be established for the individual data records of a hierarchical link table. Data for an effective start date and an effective end date are collectively called effective period data. When effective period data are included, application programs can individually perform processes retroactively.

The effective period data may or may not be established in the hierarchical node databases. Since a hierarchical node database is generally accessed in common by various application programs, an effective date for all the application programs that access the databases may be established, or either a plurality of effective dates or no effective dates may be established for the primary application programs. When an effective period is to be established for only a specific application program, the effective period data in the hierarchical link table need only be adjusted, and such data do not have to be stored in the hierarchical node databases.

To conclude the above explanation, according to the present invention, a database system comprises: hierarchical node databases, in which data that are used by application programs that execute a specific operation are stored as node data in data records; and hierarchical link tables, one of which is provided for each of said application programs, wherein relationship data, which define the hierarchical structure of node data that are stored in the hierarchical node databases, are entered as data entries in the data records. Furthermore, effective period data, which define effective periods for the data records, are stored as data entries in data records in the hierarchical link tables, but may also be stored in the hierarchical node databases.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative detailed embodiment and when read in conjunction with the accompanying drawings, wherein:

FIG. 4 is a diagram for explaining the hierarchical link table system of this invention, while comparing it with a conventional system.

FIG. 8, which includes

FIG. 9 is a diagram for explaining an example hierarchical structure for a discount calculation in FIG. 8.

FIG. 10 is a diagram for explaining an example hierarchical structure for a charge totalization process in FIG. 8.

FIG. 11 is a diagram for explaining an example wherein effective period data are set in a hierarchical link table, etc.

FIG. 12, which includes FIGS. 12A and 12B, is a diagram for explaining an example hierarchical link table wherein effective period data are set.

FIG. 13 is a diagram for explaining an example variable-length column according to the present invention.

While the invention will be described in connection with a preferred embodiment, the description is not intended to limit the invention to that embodiment. On the contrary, the invention is intended to cover all alternatives, modifications and equivalents as may be included within the spirit and scope of the invention as described by the appended claims.

DETAILED DESCRIPTION OF THE INVENTION

The preferred embodiment of the present invention will now be described. In this embodiment, for the sake of convenience while presenting the description, a system (discounting process) for calculating a charge, such as a telephone charge, is employed. Further, it should here be noted that although in the description of the present invention that follows a specific embodiment is used as an example, the invention is not limited to this embodiment, and can also be applied to other embodiments for which database systems can be constructed that can flexibly cope with alterations.

Figure 1:
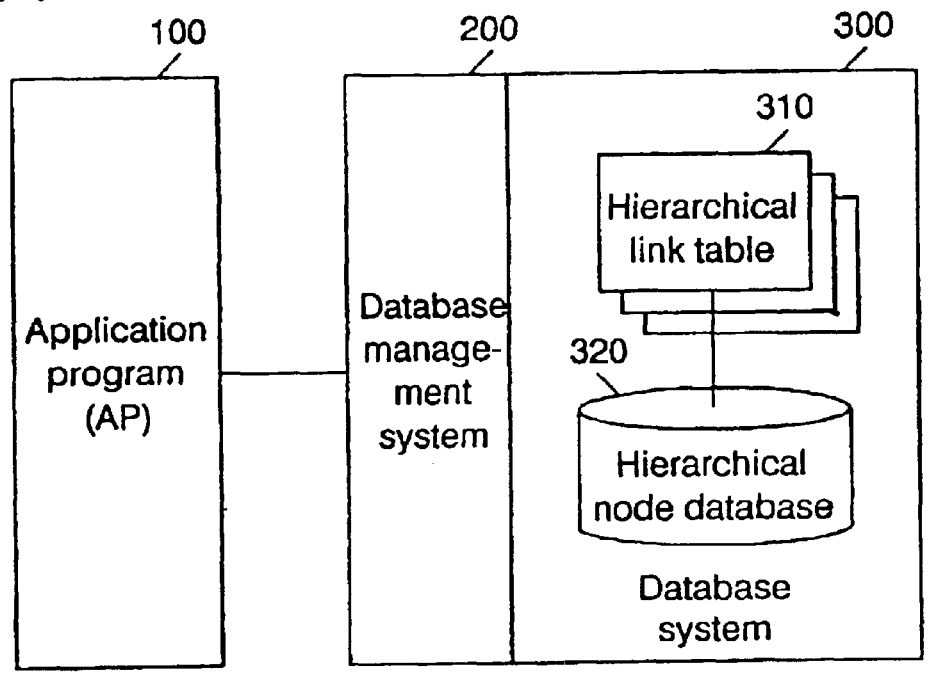
FIG. 1 is a block diagram for explaining a data processing system according to the present invention.

FIG. 1 is a block diagram for explaining a data processing system according to the present invention. An application program 100, for performing a specific operation, receives from a database system 300, via a database management system 200, data that are required for an application. Included in the database system 300 of this invention are hierarchical link tables 310 that correspond to individual application programs 100. The hierarchical link tables 310 are tables in which are stored relationship data (pointers, etc.) for databases (entities), i.e., data concerning the hierarchical structure of a hierarchical node database 320 in which data required for a corresponding application program 100 are stored. The hierarchical node database 320 is a database in which, in principle, data having no relationship data are stored. Although not shown, table data, such as a cycle control table that will be described later, are also stored in the database 320.

The data management system using the hierarchical link tables 310 of this invention will now be described by comparing it with a conventional system, while referring to FIGS. 2 to 4.

Figure 2:
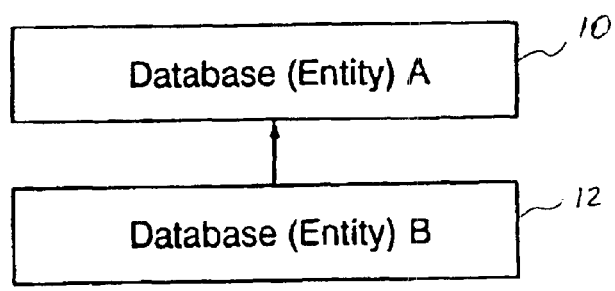
FIG. 2 is a diagram for explaining the conventional relationship of databases (entities).

FIG. 2 is a diagram for explaining a conventional relationship among databases (entities). According to the hierarchical structure of the databases in this example, entity A, block 10, is a parent and entity B, block 12, is a child. In this conventional structure, pointer data that indicate the parent entity A are stored in the data record (instance) of entity B. Therefore, when the hierarchical structure is changed, the database B must be modified.

Figure 3:
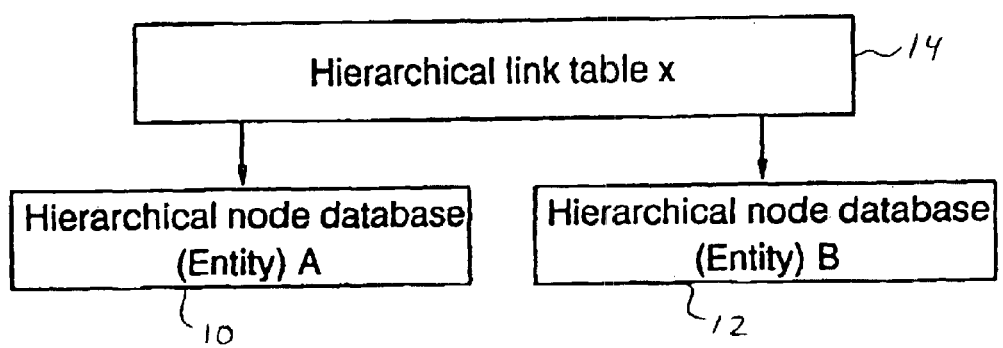
FIG. 3 is a diagram for explaining database relationships using a hierarchical link table according to the present invention.

FIG. 3 is a diagram for explaining the relationship for which the hierarchical link table of this invention is used. In this example, entities A and B are positioned as hierarchical node databases that do not include pointer data. The relationship between the two is defined in a hierarchical link table X, block 14, in which pointer data is separately stored. Therefore, even when the hierarchical structure is changed, the databases do not have to be modified; only the contents of the smaller hierarchical link table must be modified.

FIG. 4 is a diagram for explaining the hierarchical link table system of the present invention by comparing it with the conventional system. In FIG. 4, a specific application program employs a database consisting of six entities (actually, their instances). In the hierarchical structure, entity 1, block 21, is positioned as the topmost node and entities 2 and 3, blocks 22 and 23, as child nodes, are positioned at a lower level below it; entity 4, block 24, is positioned at a lower level below entity 2; and entities 5 and 6, blocks 25 and 26, are positioned at a lower level below entity 3. In the center position in FIG. 4, the data structure, block 30, used for the conventional system is shown. Attribute data 31 that are the main body of data and pointer data 32 that are used to signify the parent-child relationships (specifically, to represent the parent entities) are stored in the individual data records (data fields). In the lowest position in FIG. 4, hierarchical link tables, block 40, are shown that are used for the same data structure. Here, the pointer data 32, 33 are stored only in the data records (data fields) of the hierarchical link tables, and attribute data 31 are stored only in the data records (data fields) of the hierarchical node databases.

Figure 5:
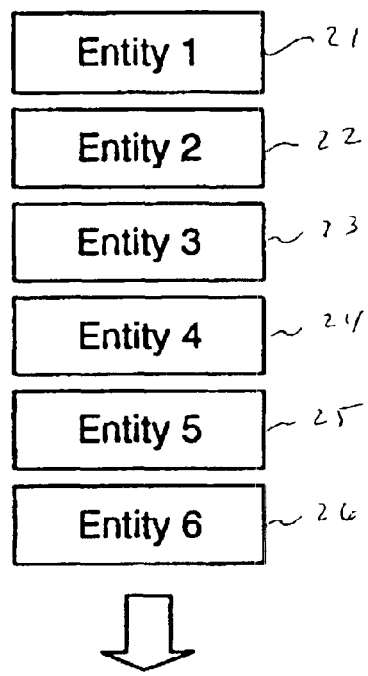
FIG. 5 is a diagram for explaining the contents of a hierarchical node database.

FIG. 5 is a diagram for explaining the contents of the hierarchical node database, block 50. The hierarchical node database provides a node ID (identifier) 51 for each of the entities that are required by all the application programs, and stores the main body of data 52 as a node attribute for each entity. That is, in the hierarchical node database, data that can be used in common by the application programs are stored as node data in the individual data records (data fields), and each application program can refer to the node IDs via the hierarchical link table to specify a required database and its hierarchical structure.

Figure 6:
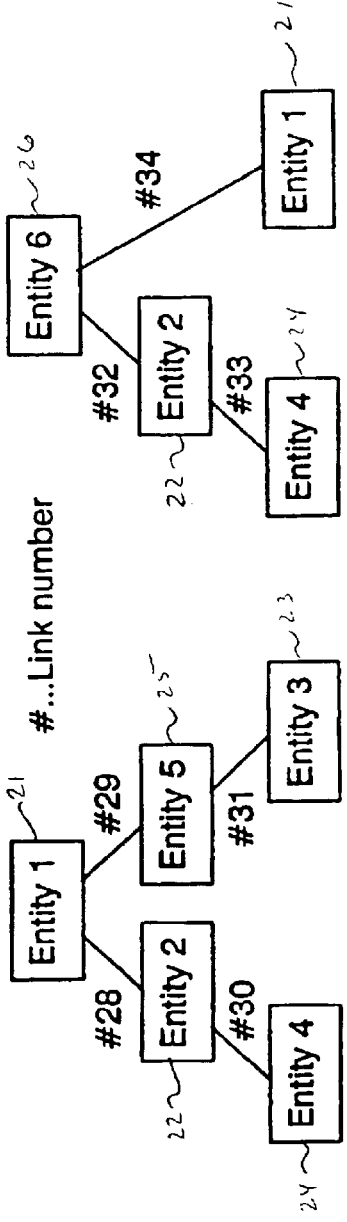
FIG. 6 is a diagram for explaining a hierarchical link table provided for each application program.

FIG. 6 is a diagram for explaining the hierarchical link table in which a different data hierarchical structure is included for each application program. The hierarchical node databases used by application programs are represented by "entities" 21, 22, 23, 24, 25 and 26. A database used by application program AP1 has a hierarchical structure wherein entity 1 is the topmost node, and entities 2, 5, 4 and 3 are sequentially positioned at lower levels. The hierarchical data structure for the AP1 is stored using link data 62 for links 28 to 31 that represent the relationship of the entities stored in hierarchical link table T1, block 60. A database used by application program AP2 has a hierarchical structure wherein entity 6 is the topmost node, and entities 2, 1 and 4 are sequentially positioned at lower levels. The hierarchical data structure associated with the application program AP2 is stored using link data 63 for links 32 to 34 that represent the relationships of the entities stored in hierarchical link table T2, block 61. As is apparent from FIG. 6, a hierarchical link table of this invention is prepared and stored for each application program.

Figure 7:
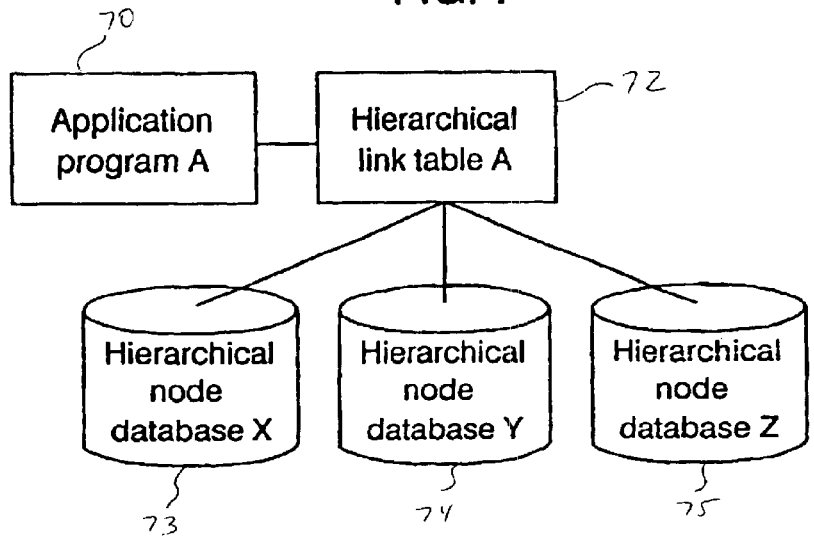
FIG. 7 is a diagram for explaining the relationship of an application program, a hierarchical link table and a hierarchical node database.

FIG. 7 is a diagram for explaining the application programs, block 70, the hierarchical link table, block 72, and hierarchical node databases, blocks 73, 74 and 75. Hierarchical link table A is provided for application program A. The relationship data (hierarchical structure data) for application program A and effective period data, which will be described later, are stored in the hierarchical link table A. Based on the contents of the hierarchical link table A, the application program A accesses target hierarchical node databases X, Y and Z to obtain required data, and performs a specific operation by using the data.

Figure 8A:
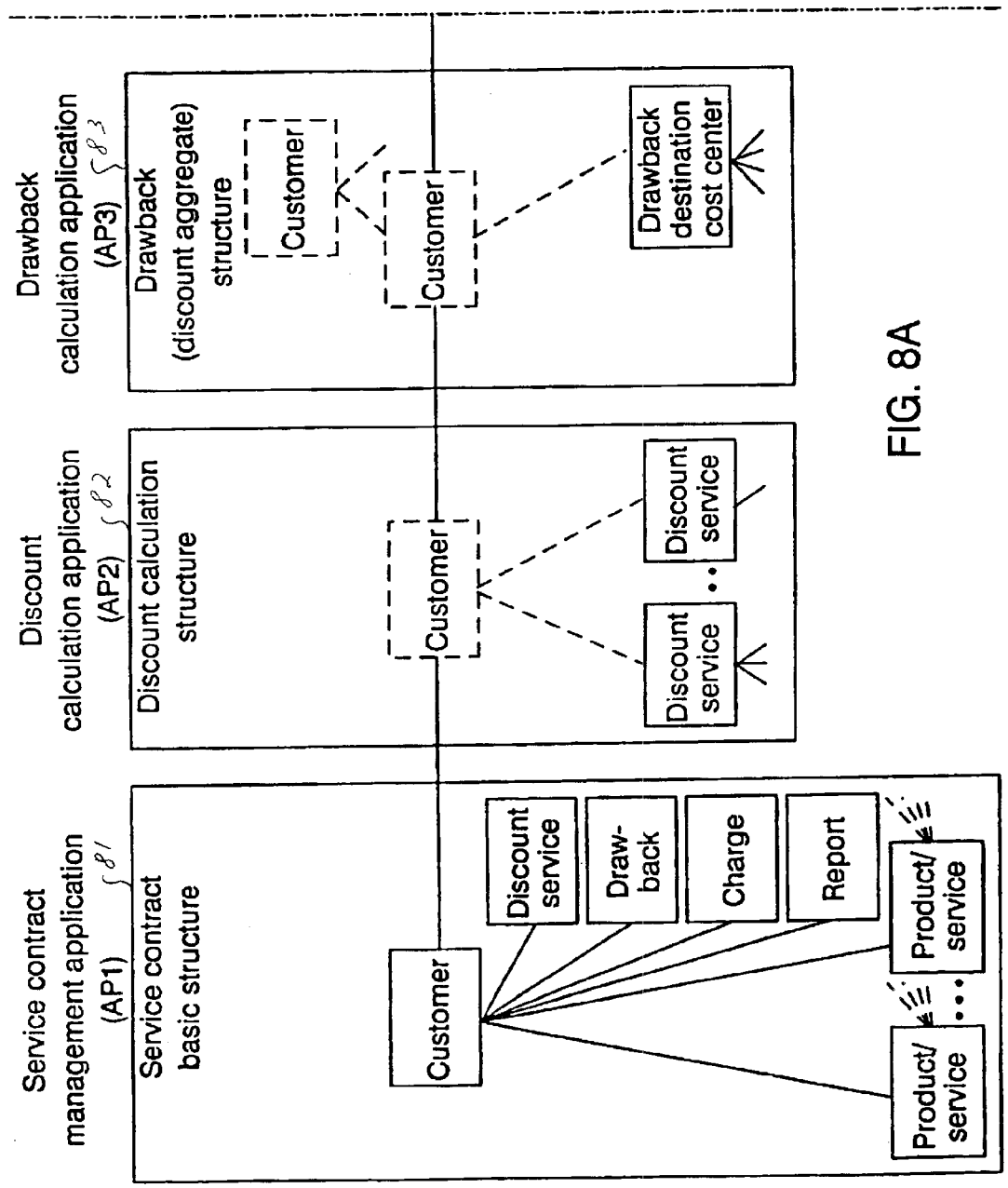
FIGS. 8A and 8B, is a diagram for explaining an example wherein the present invention is applied for a charge calculation support system for a communication company.
Figure 8B:
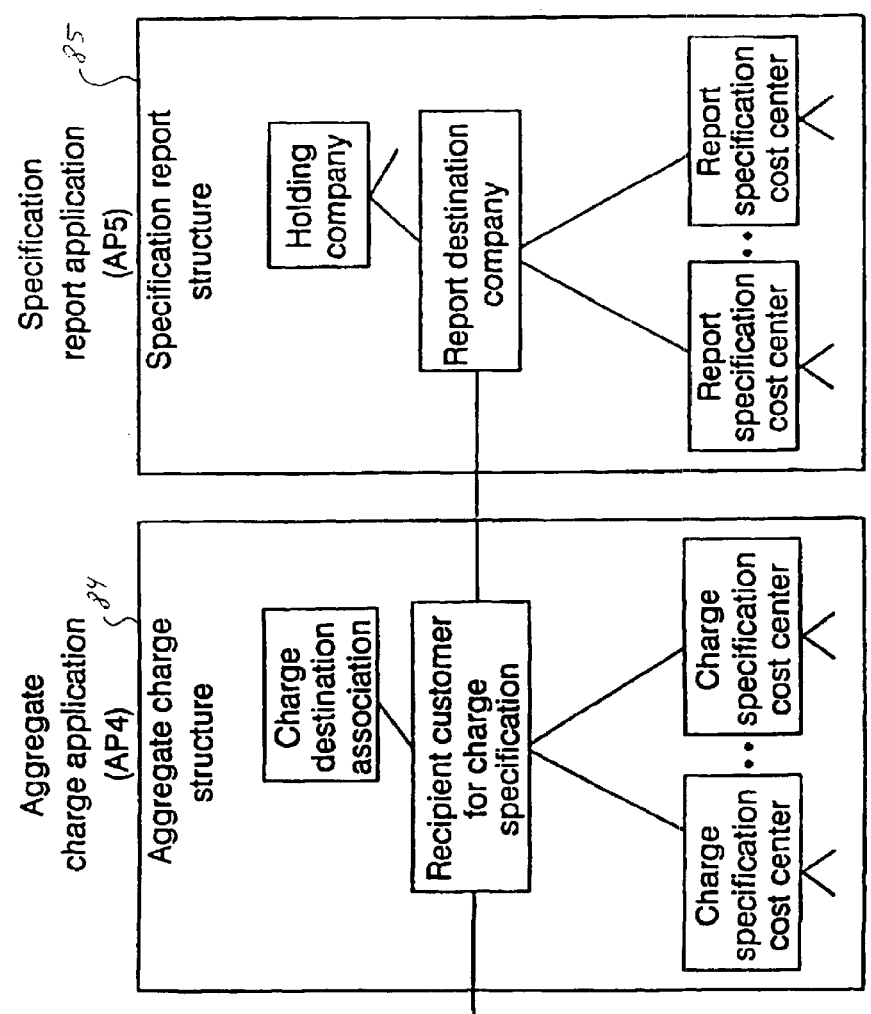

FIG. 8 is a diagram for explaining an example wherein the database management system using the hierarchical link table of this invention is applied for a charge fee support system for a communication company. In this example, five application programs (AP1 to AP5), blocks 81, 82, 83, 84 and 85, are operated for individual clients. Since the hierarchical structure differs for each application, a hierarchical link table is defined that corresponds to each application program. The hierarchical structure can be flexibly changed by altering the hierarchical link table. It should be noted that a different hierarchical structure can be employed (or is frequently employed) for each client. Although not shown in FIG. 8, each product/service in the contracted basic service structure of the application program AP1 is related not only with a customer at a higher level, but also at a lower level in another structure. Some of these applications will now be described by using them as examples while referring to FIGS. 9 and 10.

FIG. 9 is a diagram for explaining an example hierarchical structure, blocks 91 and 92, for a discount calculation program (AP2) in FIG. 8. In this example, the database is constructed of seven nodes, as is shown in the product ID column of hierarchical node database "product catalog", block 93. In FIG. 9, although there are two "attributes 4," they are included as references merely for convenience sake, and it does not mean that the same data are stored in both of them. It should be noted that data are stored in corresponding nodes in the hierarchical node database (the same thing applies for FIG. 10). The hierarchical structure of the discount calculation program AP2 in FIG. 9 is represented as hierarchical link table "discount structure 1", block 94. As is apparent from this table, there are three parent nodes, "charge calculation 4," "discount 5" and "discount 6," and corresponding child nodes are defined. From the table it can be found that the discount 5 is applied only for product/service 1 and 2, and is not applied for product/service 3 and 4.

FIG. 10 is a diagram for explaining an example hierarchical structure, blocks 101 and 102, for the charge totalization program (AP4) in FIG. 8. Basically, the same explanation can be applied as in FIG. 9, except that hierarchical node database "organization DB" is added. While, for convenience sake, hierarchical node database "product catalog" in FIG. 10 is defined as one differing from the database in FIG. 9, it may also be the same database as in FIG. 9.

The database management system using the hierarchical link table of this invention has been explained. A database management system using "effective period data" will now be explained as an even more superior system.

FIG. 11 is a diagram for explaining an example wherein the effective period data are stored in the hierarchical link table, block 111, or in data records (data fields) in the hierarchical node database, block 112. The effective period data represents a period during which the table or each data record in the database is effective relative to a corresponding application program. Generally, the date whereat the data become effective (effective start date), and the date whereat the data become ineffective (effective end date) can be entered as data. In the hierarchical link table in FIG. 11, for example, link 30 is effective for a period extending from Jan. 10th in 1999 to Mar. 31st in 1999. When the effective period has expired, the parent-child relationship of a parent node 101 and a child node 103 is also ended. Further, since link 31 has been effective since Apr. 1st in 1999, the parent-child relationship between a parent node 101 and a child node 102 is defined as having been effective since April 1st.

In FIG. 11, the effective period data are entered in the data records of the hierarchical node database. However, the effective period data may or may not be entered in the hierarchical node database. Generally, since the hierarchical node database is accessed in common by various application programs, when an effective date is established for all the application programs that access the database, or when a plurality of effective dates are established for the primary application programs, the effective period data should also be entered for the hierarchical node database. This applies to a case wherein the sales of new products are simultaneously begun (or stopped) on a specific date. When the effective period is to be established only for a specific application program, only the effective period data in the hierarchical link table have to be adjusted, and the data do not have to be stored in the hierarchical node database.

Since the application program initiates the process by examining the effective period data in the table, it does not erroneously perform a process that falls outside the effective period. When, for example, the application program performs a process at intervals corresponding to a specific time period (e.g., at the end of each month, a program totals the records stored during the month), the relationship or the hierarchical structure of a data record in the database and another related data record may be changed during the month (for example, the parent-child relationship or the positional relationship have to be changed at an instance level, such as in a case wherein client A gives a specific telephone number to another person B). While in the conventional system, the application program must be run temporarily when an alteration is made, in the arrangement of the invention that employs the effective period data, such a process need not be performed.

Figure 12B:
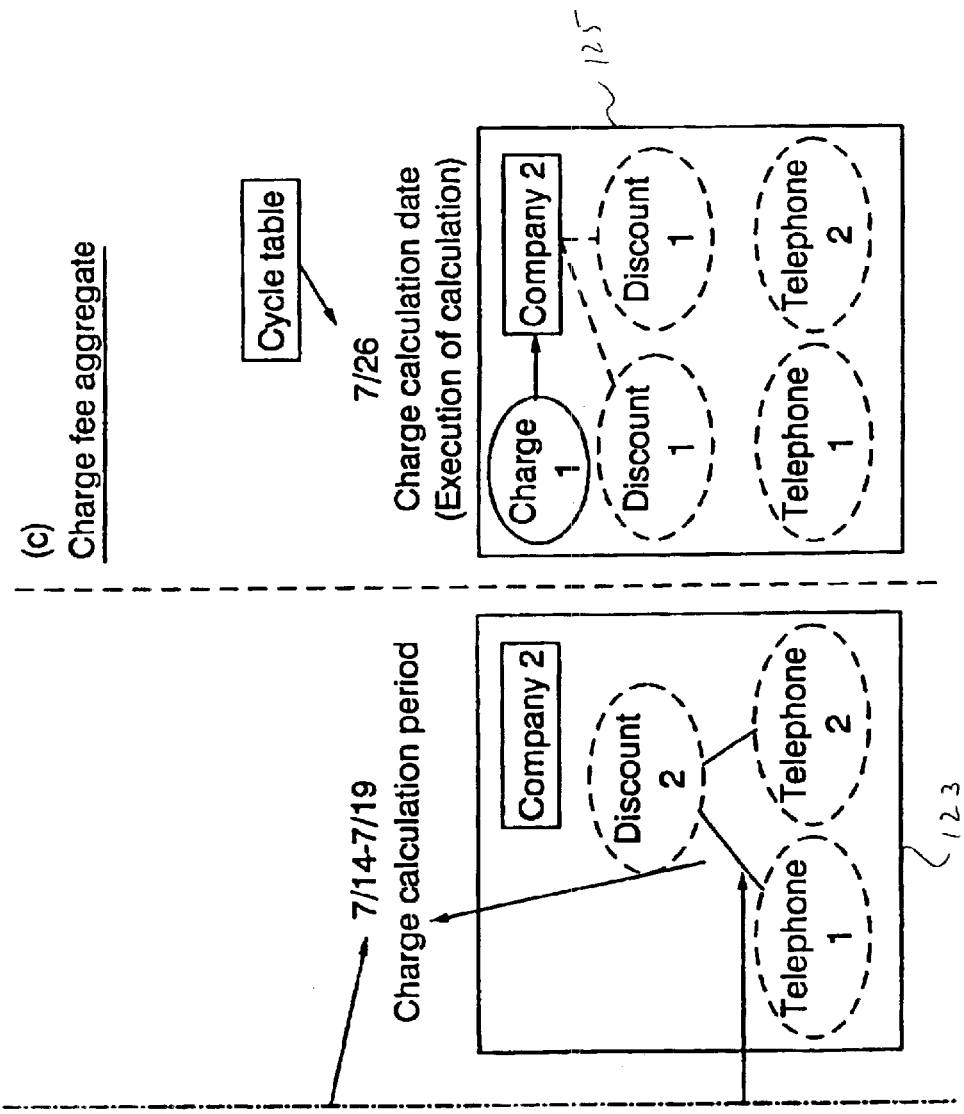

FIG. 12 includes diagrams (a), (b), and (c) for explaining examples in which the hierarchical link table is employed when effective period data have been set. In this example, the present invention is applied for the charge calculation/ charge totalization process for the communication company described above. Assume that a charge is calculated or discounted on 26th in the current month, based on the service usage data (call detail records) for a client in a period extending from the 20th of the previous month to the 19th of the current month (the current month in this example is July). First, while referring to diagram (a) of FIG. 12, block 121, an explanation will be given for the charge calculation/ discount calculation when there no changes occur during the month. In accordance with an instruction issued by the cycle control table as needed, on the 26th, which is the charge calculation/charge totalization date, the application program selects all data accumulated during a period extending from June 20th to July 19th, calculates the charge and the discount, and links the results under discount 1. The cycle control table is a table (a type of database) wherein, for a series of applications to be performed at intervals corresponding to a specific time period (yearly, quarterly, monthly, weekly or daily), the execution time and the time interval (cycle) are entered. If the identifier (also called a product ID) of the application program is designated in such a cycle table, even though not specifically shown, a necessary application program can be automatically executed by using the hierarchical structure of the invention that can be flexibly managed.

The charge calculation/discount calculation when an alteration is made during the month will now be described while referring to diagram (b) of FIG. 12. In this case, assume that a contract based on a previous service agreement (discount 1) expired on July 13th, and that a new contract started on July 14th under a new service agreement (discount 2). While referring to the cycle control table, generally, the call detail records in a period from June 20th to July 19th are selected and the charge or discount is calculated. However, since the effective end date for discount 1, block 122, in the hierarchical link table, which represents the relationship (contract condition) of telephone 1/telephone 2 is July 13th, only the charge for the period extending from June 20 to July 13th is calculated, and the result is linked under discount 1. For discount 2, block 123, the charge is calculated in the same manner for a period extending from July 14th to July 19th that is designated by the effective period data in the hierarchical link table, block 124, and the result is linked under discount 2.

For the charge totalization in diagram (c) of FIG. 12, charge 1 (charge totalization program), block 125, can examine the data records (discount 1 and 2) in hierarchical node database "discount," which is linked below, and can calculate a charge fee merely by adding together the results that are linked with these data records. Based on the charge obtained, the charging process can be performed for company 2, which is a client.

FIG. 13 is a diagram, block 131, showing an example variable-length column that improves even more the flexibility of the database management system of this invention. All or part of the primary hierarchical node databases described above can be formed as databases that have the same records, each of which consists of a fixed-length column and a variable-length column. Specifically, only data having a size that is always constant, e.g., a record identifier (node identifier) and effective period data, are stored in the fixed-length column of each data record, and all the attribute data for the pertinent database (entity) are stored in the variable-length column. As a result, the records of various entities, such as clients, services and facilities, can be standardized into a small number of super types, so that the load imposed by the maintenance and the management of a database can be reduced. In FIG. 13, in order to facilitate the maintenance and the management of the equipment database for a communication company and to obtain flexibility for performing alterations, the entity types related to the equipment and attribute data are stored in the variable-length column, and only the effective period data are stored in the fixed-length column. Thus, various entities can be included in the same database structure.

The merits of the present invention have been explained by using several examples, but the invention has another merit in that a target for each application process can be logically controlled separately and independently. This will now be described by using several applications in FIG. 8, while referring to FIGS. 14 and 15.

Figure 14A:
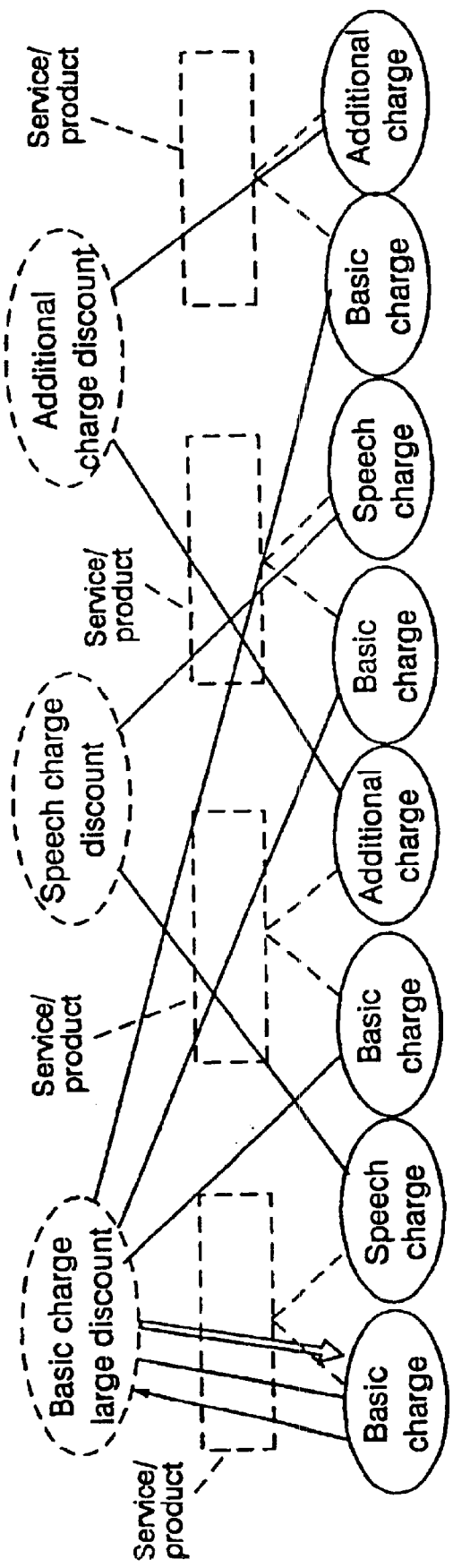
FIG. 14 is a diagram for explaining an example wherein the present invention is applied for a drawback calculation for a communication company.

FIGS. 14A and 14B are diagrams for explaining an example wherein the database management system of this invention is applied for a drawback calculation, which is one of the charges applied by a communication company. A drawback calculation is a calculation process, during which a fee calculated for each client (including a calculated discount) is charged, at a rate designated by the client, to a charge destination (drawback destination) that is designated by the client. The hierarchical structure for the charge calculation/discount calculation, block 141, in FIG. 14A is separated from the hierarchical charge structure in FIG. 14B, by defining different hierarchical link tables. Based on the charge/discount hierarchical calculation structure in FIG.

14A, charges are calculated in accordance with the various services rendered, while, based on the hierarchical charge structure, block 142, in FIG. 14B, the fee charged is calculated using a method designated by the client. Therefore, the flexibility required to cope with changes is increased, since, for example, the charge destination is designated or changed by the client, and the maintenance of each hierarchical structure is facilitated. Generally, the charge/discount calculation hierarchical structure in FIG. 14A is determined in accordance with the specification of a product or service, while the hierarchical charge structure in FIG. 14B is determined by the organization or location of a client. In FIG. 14, the drawback generated in the discount calculation is defined as a simple proportional allotment, and in the charge totalization process, a hierarchical structure for discount totalization is prepared separately from the hierarchical structure for pre-discounted charge totalization. As a result, various drawback distribution methods, i.e., various proportional allotments (contribution allotment)/equal allotments/special allotments, which are requested by the client, can be flexibly employed.

Figure 15:
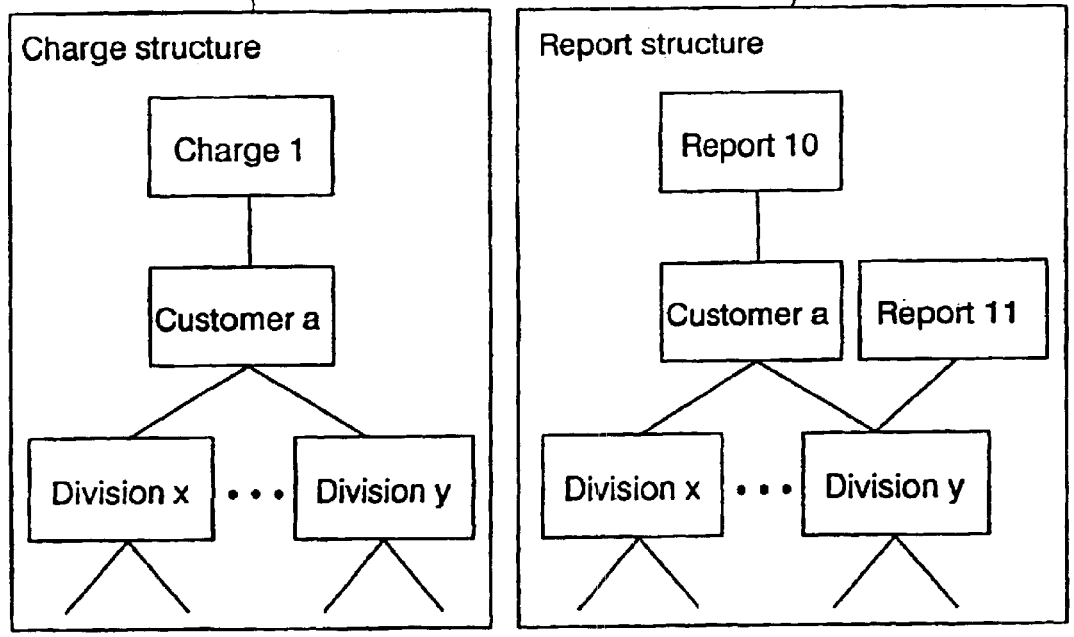
FIG. 15 is a diagram for explaining another example wherein the present invention is applied for a charge calculation for a communication company.

FIG. 15 is a diagram for explaining another example wherein the database management system of this invention is applied for the application of charges for a communication company. In FIG. 15, a charge structure, block 151, and a report structure, block 152, are arbitrarily and independently defined for each client by using different hierarchical link tables. The database relationship/hierarchical structure used for this charge process is also called a group charge structure. Conventionally, a group charge structure must be modified each time a client changes a request, and a great amount of labor is required to change many associated databases. However, when the database relationship is defined by using a hierarchical link table, only this small link table must be changed, so that the alteration process can be easily performed. That is, the system of the invention that can employ a hierarchical link table to define the group charge structure can flexibly cope with a request from a client to change the related conditions.

In a charge process (charge 1) for a client, a customer "a," the "charge" application program calculates and adds together the charges for services that were provided for customer "a" and divisions x, . . . and y at a lower level, and transmits a charge to the address of the customer "a." The "report" application program performs a process (report 10) for the pertinent customer, and transmits the aggregate (and the specification) of the customer "a" and the divisions x, . . . and y to the address of the customer "a." For division y, the "report" application program performs a process (report 11), and reports the aggregate (and the specification) for the division y to the address of the division y.

Advantages of the Invention

As is described above, according to the database management system that uses the hierarchical link table of the present invention, a database system can be provided that can flexibly and quickly cope with an addition or a change in the contents of an application or its associated data (including data related to services and clients). In addition, since the effective period data for this invention are included, even when data must be added or changed during a target period, an appropriate retroactive process can be quickly and easily performed.

While the invention has been particularly shown and described with reference to a preferred embodiment, it will be understood that various changes in form and detail may be made therein without departing from the spirit and scope of the invention.

What is claimed is:

1. A database system, for storing and managing data that are used by application programs to execute a specific operation, comprising:
   a hierarchical node database wherein data used for said application programs are stored as node data in data records; and
   a hierarchical link table, provided for each of said application programs, which comprises relationship data that defines a hierarchical structure of said node data that are stored in said hierarchical node database wherein the hierarchical link table includes effective period data that defines effective periods for the defined hierarchical structure, and wherein the hierarchical link table includes an identifier of an application program associated with the defined hierarchical structure.

2. The database system according to claim 1, wherein said hierarchical node database includes effective period data that define said effective periods for said data records, the effective period data being stored as data entries in individual data fields.

3. The database system according to claim 2, wherein each of said data records in said hierarchical node database includes a fixed-length column in which only data entries having a constant size are stored, and a variable-length column in which only data having variable sizes are stored.

4. A database system for storing and managing data for use by a plurality of application programs that perform distinct operations, comprising:
   a hierarchical node database that stores node data to be used by a first and a second application program;
   a first hierarchical link table that defines a first unique hierarchical structure of the node data for use when the first application program is run, wherein the first hierarchical link table includes an identifier that identifies the first application program; and
   a second hierarchical link table that defines a second unique hierarchical structure of the node data use when the second application program is run, wherein the second hierarchical link table includes an identifier that identifies the second application program.

5. The database system of claim 4, wherein the node database comprises a plurality of data entries, each having a node identifier and a set of node attributes, and wherein the node attributes comprise non-relational data.

6. The database system of claim 5, wherein the each hierarchical link table includes a set of links that define relationships between parent and child nodes using the node identifiers from the node database.

7. The database system of claim 6, wherein each hierarchical link table includes time period fields for each link to optionally establish start and end times for each link.

8. The database system of claim 5, wherein the each data entry in the node database includes time period fields to optionally establish start and end times for each data entry.

9. The database system of claim 4, wherein the first application program provides a first monetary rate scheme for a telecommunications provider, and the second application program provides a second monetary rate scheme for the telecommunications provider.

10. A database system, for storing and managing data that is used by a plurality of application programs to execute distinct operations, comprising:
    a hierarchical node database, wherein data used for the application program is stored as node data in data records, and wherein the hierarchical node database includes effective period data for at least one data record that defines a time period when at least one data record is effective for each of said plurality of application programs; and a hierarchical link table, provided for each of said application programs, which comprise relationship data that defines a hierarchical structure of the node data that is stored in the hierarchical node database, and wherein the hierarchical link table includes an identifier of an application program associated with the defined hierarchical structure.

11. A database system, for storing and managing data that are used by application programs to execute a specific operation, comprising:

a hierarchical node database wherein data used for said application programs are stored as node data in data records;

a hierarchical link table, provided for each of said application programs, which comprises relationship data that defines a hierarchical structure of said node data that are stored in said hierarchical node database wherein the hierarchical link table includes effective period data that defines effective periods for the defined hierarchical structure, and wherein the hierarchical link table includes an identifier of an application program associated with the defined hierarchical structure; and a cycle control table in which cycle data are entered to define execution timings for said application programs that execute operations at constant time intervals.

12. The database system according to claim 11, wherein said hierarchical node database includes effective period data that define said effective periods for said data records, the effective period data being stored as data entries in individual data fields.

13. The database system according to claim 12, wherein each of said data records in said hierarchical node database includes a fixed-length column in which only data entries having a constant size are stored, and a variable-length column in which only data having variable sizes are stored.

* * * * *

UNITED STATES PATENT AND TRADEMARK OFFICE
CERTIFICATE OF CORRECTION

PATENT NO. : 6,947,946 B2
DATED : September 20, 2005
INVENTOR(S) : Hidenori Nishikawa It is certified that error appears in the above-identified patent and that said Letters Patent is hereby corrected as shown below:

Column 12,
Line 40, insert -- for -- after "data".

Signed and Sealed this

Seventh Day of February, 2006

JON W. DUDAS
*Director of the United States Patent and Trademark Office*